(12) United States Patent
Cavaliere

(10) Patent No.: US 9,387,604 B2
(45) Date of Patent: Jul. 12, 2016

(54) METHOD FOR MAKING A MOLDING CORE, AND MOLDING CORE FOR MAKING A COMPLEX PART MADE OF A COMPOSITE MATERIAL

(75) Inventor: Frédérick Cavaliere, Montigny le Bretonneux (FR)

(73) Assignee: European Aeronautic Defence and Space Company EADS France (FR)

( * ) Notice: Subject to any disclaimer, the term of this patent is extended or adjusted under 35 U.S.C. 154(b) by 1258 days.

(21) Appl. No.: 12/745,069

(22) PCT Filed: Nov. 21, 2008

(86) PCT No.: PCT/EP2008/065977
§ 371 (c)(1),
(2), (4) Date: Oct. 15, 2010

(87) PCT Pub. No.: WO2009/068479
PCT Pub. Date: Jun. 4, 2009

(65) Prior Publication Data
US 2011/0042863 A1    Feb. 24, 2011

(30) Foreign Application Priority Data
Nov. 30, 2007   (FR) ...................................... 07 59453

(51) Int. Cl.
*B29C 33/38* (2006.01)
*B29C 33/50* (2006.01)
*B29C 70/44* (2006.01)

(52) U.S. Cl.
CPC ........... *B29C 33/3821* (2013.01); *B29C 33/505* (2013.01); *B29C 70/44* (2013.01)

(58) Field of Classification Search
CPC .......................... B29C 33/3821; B29C 33/505
USPC ............. 264/45.2, 45.3, 46.4, 46.6, 222, 313, 264/314, 334, 318, 257
See application file for complete search history.

(56) References Cited

U.S. PATENT DOCUMENTS

| | | | | |
|---|---|---|---|---|
| 5,262,121 A | * | 11/1993 | Goodno | .............. B29C 33/3821 156/156 |
| 2003/0034588 A1 | * | 2/2003 | Miura | ..................... B29C 43/10 264/258 |

(Continued)

FOREIGN PATENT DOCUMENTS

| | | |
|---|---|---|
| DE | 102005056420 | 5/2007 |
| FR | 2898538 | 9/2007 |

(Continued)

OTHER PUBLICATIONS

International Search Report dated Apr. 6, 2009.

*Primary Examiner* — Alison L Hindenlang
*Assistant Examiner* — Lawrence D Hohenbrink, Jr.
(74) *Attorney, Agent, or Firm* — RatnerPrestia

(57) ABSTRACT

In order to make a structure of a composite material including elongated hollow shapes, such as hollow shapes associated with stiffeners of a stiffened panel, the invention comprises making cores including a bladder made of an elastomer material. The invention relates to a method for making such extractable cores in order to obtain cores having a very important length, and allowing the use of said cores for the industrial production of composite parts. The bladder is a cylindrical bladder that is conformed in a core mould, wherein the core itself does not have to be cylindrical, before being filled with a granular material and submitted to a negative pressure in order to impart a stable shape to the core by compaction of the granular material.

5 Claims, 2 Drawing Sheets

(56) References Cited

U.S. PATENT DOCUMENTS

| | | | | |
|---|---|---|---|---|
| 2004/0103918 A1* | 6/2004 | Teufel | ................... | B29C 33/485 134/8 |
| 2007/0175577 A1* | 8/2007 | Dagher | ................ | B29C 33/505 156/229 |
| 2009/0309264 A1* | 12/2009 | Cavaliere | ............ | B29C 33/3821 264/319 |

FOREIGN PATENT DOCUMENTS

| | | | |
|---|---|---|---|
| FR | 2898539 | 9/2007 | |
| FR | WO 2007107552 A1 * | 9/2007 | .......... B29C 33/3821 |
| FR | WO 2007107553 A1 * | 9/2007 | .......... B29C 33/3821 |
| WO | WO 2005/105402 | 11/2005 | |
| WO | WO 2007107552 A1 * | 9/2007 | |
| WO | WO 2007107553 A1 * | 9/2007 | |

* cited by examiner

METHOD FOR MAKING A MOLDING CORE, AND MOLDING CORE FOR MAKING A COMPLEX PART MADE OF A COMPOSITE MATERIAL

RELATED APPLICATIONS

This is a national phase application of International Application No. PCT/EP2008/065977 which claims priority to French Application FR 0759453, filed Nov. 30, 2007, the content of which is incorporated by reference in its entirety and for all purposes.

FIELD

The present invention pertains to the field of making parts made of composite materials.

More particularly, the present invention pertains to the making of molding cores used for making parts made of a composite material when the parts comprise hollow volumes for which the molding cores are used at a stage of the making.

BACKGROUND

Composite materials comprising fibers maintained in a matrix are currently widely used for making parts in many fields of industry, in particular in the field of aeronautics, including for structural parts, i.e., in view of supporting significant efforts on the order of magnitude of their structural resistance during their use.

There are many composite materials, the most widespread in the field of parts designed for structures, such as those used in aeronautical constructions, being composed of more or less long fibers of inorganic or organic (glass, carbon, aramid . . . ) materials contained in a matrix formed by a hard organic resin, which, at least one stage of the method for making the part, is sufficiently fluid to make possible the making of the shapes of the parts [sic—Tr.] before being hardened, for example, by polymerization.

To combine lightness and stiffness, some components such as structural panels with large dimensions, such as the panel 10 shown in FIG. 1a, are made by means of a relatively thin skin 12, whose stiffness is reinforced by stiffeners 13a, 13b assembled on one or both surfaces of said skin. The stiffeners may have various shapes, for example, the so-called Ω shapes of FIG. 1a and FIG. 1c, or Z, U and L shapes, for example.

The structural parts of this type made of composite material must meet the manufacturing tolerances and strict quality requirements.

They are most often made by means of molds which guarantee, by an appropriate use, the qualities sought for the part, in particular the dimensional characteristics, geometry and resistance.

A particular difficulty encountered during the making of certain shapes of the part, such as the stiffened panel 10 of FIG. 1a, is linked with the existence of closed hollow volumes 13a, 13b which generally requires using mold elements, which are more or less inserts of the manufactured part and which have to be extracted therefrom when the matrix of the composite material of the part is hard.

Quite obviously, the extraction of these elements from molds or cores must be carried out without damaging the part, and this proves to be more or less difficult when the core is relatively enveloped, i.e., enclosed, in the part made of composite material, for example, stiffeners having an Ω-shaped cross section of FIG. 1a.

In this case, and short of making the stiffeners separately from the skin and proceeding with a later assembly, which is a less satisfactory solution industrially than a simultaneous making of the different components of the panel, the core must be extracted, destroying it or deforming it, because most often the shape of the panel, of the stiffener and of the resulting hollow volume has variations in shape and cross section which make the extraction of the entire core very difficult as FIG. 1b illustrates.

When, because of the shape of the hollow volume such as that corresponding to a stiffener, the core has a very elongated shape, it is difficult to reconcile both the dimensional precision of the core, which is a precision necessary for the precision of the dimensions of the part made, and the stiffness of the core during the making of the part, which is a stiffness that also influences the precision of the part made.

The cores that are destroyed because of being extracted from the part, particularly meltable cores, can be made with good dimensional tolerances, but have the drawback of being heavy and expensive to make, being disposable and most often of having different coefficients of dilatation from those of the composite materials generally used, which makes their use problematic for long shapes, particularly during the making of stiffeners.

The cores entirely made of elastomer, depending on the cross section of the core and the hardness used, either do not have high dimensional stability and are capable of being deformed during the making of the part made of composite material, or do not have striction, and therefore a reduction of cross section, necessary during the removal from the mold, and are removed from the mold with great difficulty with risk of damage to the part made of composite material.

A prior-art solution described in French patent application published under No. 2,898,539 leading to high-quality results consists of making the cores by means of hollow bladders made of silicone.

To make a core, a bladder is made out of silicone with a relatively fine wall closest to the desired shape of the core, in practice in a bladder mold having the shape of the core.

The hollow bladder thus made is placed in a stiff core mold having the desired shape for the core, which it molds by the manufacture itself.

The hollow interior of the bladder is then filled with glass or metal beads and, when the bladder is full of beads, the interior of the bladder is placed under negative pressure, which has the effect of bringing about a compaction of the beads which are blocked in relation to one another without a significant change in the apparent volume of the bladder.

The bladder is then removed from the core mold and forms a core with stable dimensions, corresponding to the dimensions of the core mold, which can be used.

When the part made of composite material is made, the beads are removed from the bladder through an opening and the envelope of the bladder becomes supple and deformable enough to be easily extracted from the part.

The advantage of this method is to be able to form elongated cores, having the stiffness that is needed during the making of the composite part, and being extractable without damaging the part made of composite material. The bladder may be reused several times to make identical cores within the framework of a mass production of parts made of composite material.

A drawback of this method derives from the need to make bladders by molding. In fact, it was discovered by the inventor of the present invention that currently only the molding technique makes it possible to achieve tolerances on the order of a tenth of a millimeter on the dimensions of the cross section of the bladders, a precision necessary for making composite parts of aeronautical quality. This molding technique for bladders becomes a major drawback within the framework of manufacturing a composite part on an industrial scale using cores of very great length. In fact, the molding technique is not suitable for the manufacture of bladders of great length because of a very high risk of nontightness of the bladders, of a noncompliance with the outer shape of the bladders, and of a reduction in the tensile strength.

Molding tools of great length require devices for maintaining the molding air gap creating holes in the bladders, the bladders having to be taken up again to make a sealing of the said holes. End-to-end connection operations of bladder segments to obtain a bladder of great length may also be carried out. The high risks of nontightness are due to the operations of taking up the bladders again and to the end-to-end assembly operations.

Operations of taking up again and/or assembling the molded bladders bring about surface defects of the cores which are the source of markings of the parts made of composite material. These markings of the composite parts may bring about a high rate of rejection of the composite parts.

The operations of taking up again and/or assembling the molded bladders are also sources of local reductions in strength of the bladders and increase the risk of tearing of the bladder during the pulling of the bladder during the removal from mold operation.

For these reasons molded bladders of great length do not meet such industrial requirements as the cost of the cores, compliance with the manufacturing tolerances of the cores and composite parts or the rate of rejection of the composite parts.

Another consequence is the need to make as many models of bladders and bladder molds as shapes of cores to be made.

Hence this core making technique proves to be costly and very risky to use on an industrial scale.

SUMMARY

To make cores of very great length, with lower cost, with fewer technical risks, and more practical to make for an industrial manufacture of parts made of composite materials, the present invention proposes to make cores by means of elongated, cylindrical bladders of a constant cross section.

According to a method for making a molding core for a part made of composite material, the core having a dimension, length Ln, great with regard to the characteristic dimensions, widths ln and heights hn, standard cross sections of the said molding core, the core is made by means of a bladder made of elastomer giving rise to an internal volume filled with a granular material and subjected to a differential pressure $\Delta Pe$ between the internal volume and an external space of the bladder, a pressure such that the internal volume is at a pressure below the external space. Before filling the internal volume and before application of the differential pressure $\Delta Pe$, the bladder is formed in a core mold, comprising a hollow cavity with shapes and dimensions of the core, by deforming by means of a differential pressure $\Delta Pg$ established between the internal volume of the bladder at a pressure P1 and the external space at a pressure P2, which is below P1. This bladder made of elastomer, which, before being subjected to the differential pressure $\Delta Pg$ and to a filling of the internal volume with the granular material, is more or less cylindrical, of a length Ln and of which a perimeter of any standard cross section, which is more or less constant, is always lower than the perimeters of the standard cross sections of the core.

The differential pressure $\Delta Pg$, which is applied during the filling of the core with granular material and which is interrupted before application of the differential pressure $\Delta Pe$ and removal of the core from the mold, is advantageously obtained at least in part by a partial vacuuming of a space located between the core mold and an external surface of the bladder and/or by an increase in the pressure in the internal volume of the bladder.

The present invention also pertains to a molding core for a part made of composite material, said core having a dimension, length Ln, which is great with regard to the characteristic dimensions, widths ln and heights hn, standard cross sections of the molding core. The molding core comprises a bladder made of elastomer giving rise to an internal volume filled with a granular material and subjected to a differential pressure $\Delta Pe$ between the internal volume and an external space of the said bladder, such that the internal volume is at a pressure below the external space. The bladder made of elastomer, before being deformed to correspond to the shape of the core, has a more or less cylindrical shape of a length Ln and of which a perimeter of any standard cross section, which is more or less constant, is always lower than the perimeters of the standard cross sections of the core.

In a particular embodiment, the molding core has standard cross sections which are more or less perpendicular to a longitudinal direction corresponding to length Ln of the core, of shapes and/or dimensions variable according to the standard cross section in question, which corresponds, for example, to the dimensions and to the shape of a hollow volume to be made in a part made of composite material between a stiffener and a skin of the part made of composite material.

To make a bladder made of elastomer for such a molding core of a part made of composite material and giving rise to an internal volume of the bladder designed to be filled with a granular material, an essentially cylindrical shape is given to the bladder over a length Ln corresponding to the length of the molding core and of which one cross section of the cylindrical length is always of a perimeter lower than the perimeters of all the cross sections of the molding core.

To be able to apply the differential pressures anticipated effectively, the bladder comprises end parts mounted at the ends of the cylindrical length of the bladder, end parts which are capable of ensuring a tightness of the internal volume of the bladder.

For filling or emptying the bladder of granular material, at least one of the end parts has an opening allowing the filling or extracting of granular material from the internal volume.

To be able to vary the differential pressure between the internal volume of the bladder and the outside of the bladder, at least one of the end parts comprises means for connecting to means for exhausting or generating a gas under pressure.

To make bladders of any length without restriction, the cylindrical length of the bladder is advantageously obtained by a method of extrusion-pultrusion of the elastomer, which is a silicone in a preferred embodiment.

BRIEF DESCRIPTION OF THE DRAWINGS

The present invention is described in reference to the figures, wherein which.

DETAILED DESCRIPTION

The present invention pertains to a molding core for making parts made of composite material, a method for making a molding core and a bladder used for making the said core.

Figure 2:
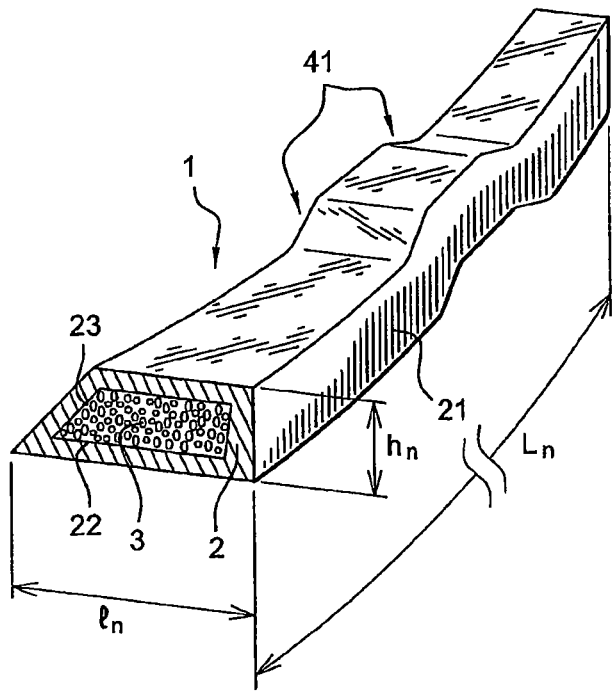
FIG. 2 shows an example of a core according to the present invention in a perspective view and with an end section.

A molding core 1 according to the present invention, shown in FIG. 2, used during the making of a part 10 made of composite material in order to make in said part a hollow volume 14a, 14b of an elongated shape, such as a volume closed by a stiffener 13a, 13b of a skin 12, comprises a bladder 2 made of elastomer filled with a granular material 3.

The bladder 2 has an external surface 21 that defines a volume of the core 1 and an internal surface 22 that defines an internal volume 23 of the bladder.

The elastomer of the bladder 2 is a material that has characteristics of elasticity, suppleness and resistance to chemical and thermal environments encountered in the process of making parts made of composite materials.

Elasticity should be defined in that the material forming the bladder 2 may be elongated, to a certain extent, and resume a characteristic dimension before elongation.

Suppleness should be defined in that the bladder 2 is capable of being deformed, to a certain extent, without being damaged.

Resistance to chemical and thermal environments should be defined by the material of the bladder 2 not being more or less, or at least not quickly with regard to the use which is made of the bladder, degraded by the conditions encountered during the making of parts made of composite materials into inorganic or organic fibers (glass, carbon, aramid . . . ) maintained by an organic resin, in particular the conditions linked with the chemical aggressiveness of the resins and with the thermal curing operations generally used to bring about hardening of the resin.

Such an elastomer is advantageously a silicone, a material which has the characteristics sought in the majority of the situations encountered currently in the industry for making composite materials considered within the framework of the present invention.

The molding core 1 has a length Ln, which is great with regard to the characteristic dimensions of the cross sections, for example, a width ln and a height hn of a cross section of the core.

As in the example illustrated in FIG. 2, most often the core has a complicated shape. For example, the core has at least one general curvature, local surface curvatures 41, for example, the curvatures corresponding to local variations in the thickness of the skin 12, and standard cross sections that more or less change in terms of dimensions and shape.

Figure 1A:
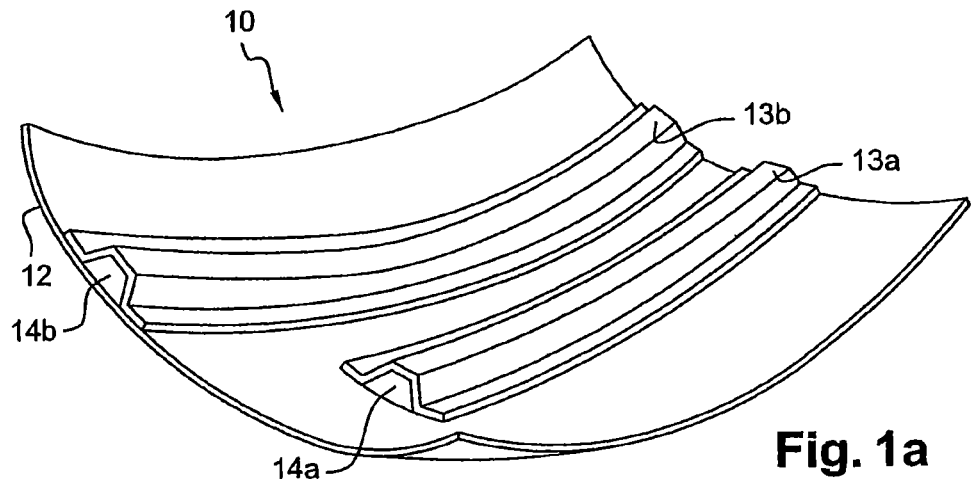
FIG. 1 shows, already mentioned, by way of example, a stiffened panel, representing a part made of composite material, in a perspective view in FIG. 1a, in a section along a direction parallel to the longitudinal direction of a stiffener in FIG. 1b, and in a section along a direction perpendicular to the longitudinal direction of a stiffener in FIG. 1c.
Figure 1B:
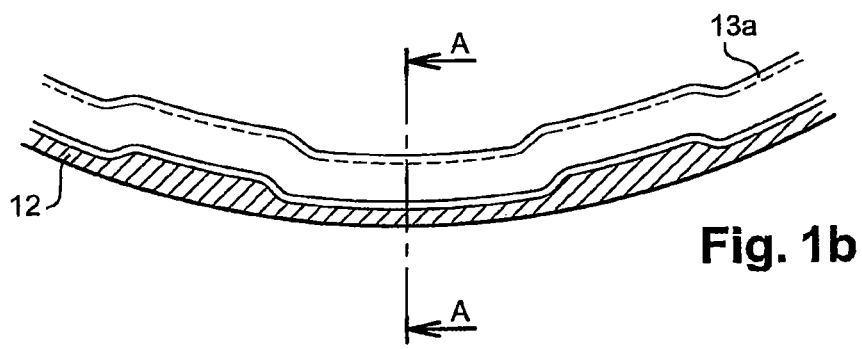
Figure 1C:
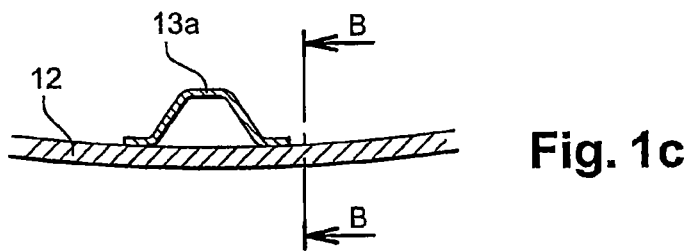

These geometrical characteristics are necessary so that a stiffener 13a, 13b made by using the core 1 in question has all the desired characteristics and in particular is in perfect fit with the skin 12 of the panel 10, to which said stiffener is integrated, the said panel being able to have complicated shapes such as multiple curvatures and a skin comprising a surface of support for the stiffener of irregular shape as illustrated in FIG. 1b.

Figure 3:
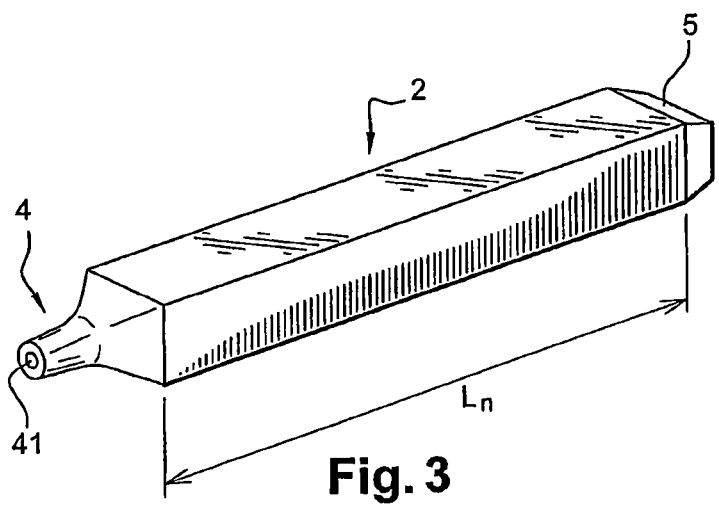
FIG. 3 shows an example of a bladder for a core according to the present invention.

To make the core 1, the bladder 2 shown in FIG. 3 is a bladder made of elastomer, for example, silicone, which, before a shaping to make the core, has a cylindrical shape.

In practice, the bladder has a constant standard cross section that is close to manufacturing tolerances and is formed from a single part over its length by a continuous method of extrusion-pultrusion.

The extrusion-pultrusion method is a prior-art method during which the formed material passes through a die of a given, predetermined outlet cross section and is applied to the elastomers and in particular to the silicone as extruded material.

In addition, an external perimeter of a standard cross section of a bladder, corresponding to the external surface 21 of the bladder 2, is selected to be at most equal, preferably always slightly lower than the lowest of the perimeters of the standard cross sections of the core to be made with the said bladder and the shape of the constant cross section of the bladder is selected to be as close as possible to the shapes of the cross sections of the core to be made.

These characteristics of the extruded bladder are obtained by giving the desired shapes and dimensions to an extrusion die, taking into account the dispersion of the dimensions of the bladder made by the extrusion-pultrusion method.

In fact, because of a not easily controlled behavior of the extruded material, the elastomer, at the outlet of the die, the dimensions of the cross sections of the bladder 2 have deviations more or less in relation to the theoretical dimensions, in practice on the order of more or less one mm, much greater than the desired tolerances for the core 1.

To make a bladder 2, a useful length Ln of a bladder of constant cross section is obtained by extrusion-pultrusion, the length Ln being theoretically unlimited and which, using this method, easily reaches values whose orders of magnitude are at least two times greater than values of the characteristic dimensions ln and hn of the cross section of the bladder, and is closed at its ends by the connected parts 4, 5, which create a tightness of the internal volume 23 of the bladder.

The length Ln is preferably at least equal to the length of the hollow volume 14a, 14b to be made, for example, the length of the stiffeners 13a, 13b in the panel in question.

A first part 4 mounted at a first end of the bladder 2 comprises an opening 41, whose cross section is selected to make possible the filling and the emptying of the internal volume 23 of the bladder with the granular material 3.

The opening 41 is also capable of being connected to means for controlling (not shown) the pressure of a gas, advantageously of air, in the bladder.

Such means essentially consist of means for exhausting or blowing gas.

The second part 5 mounted at the second end opposite the first end is an element for closing the bladder.

Preferably the said second mounted part has a shape adapted to the desired shape for the hollow volume of the part 10 to be made.

Advantageously, this shape of the second mounted part 5 is additionally defined to make the extraction of the bladder 2 easier when the part 10 made of composite material has been made, for example, a truncated cone shape or a tapered shape.

In one embodiment, not shown, each end has an opening and is formed to meet the requirements of the part to be made.

For example, one end of the bladder has an opening suitable for the filling and emptying of the granular material and the other end of the bladder has an opening suitable for the connection of means for controlling the pressure of the gas in the bladder.

A description of the method using the bladder 2 to make the core 1 makes it possible to better understand the advantages of the characteristics of the bladder 2.

In a first step, to make the core 1, the bladder 2 is placed in a closed, stiff mold, in which a hollow cavity corresponds to the shape and to the dimensions of the core 1 to be made.

In a known manner, the mold is formed by an assembling of components to make easier the extraction from the core 1 once the said core has been made.

Because of the dimensional characteristics of the bladder 2, whose perimeter is always, before undergoing deformations, lower than the perimeters of the different cross sections of the core 1, the said bladder made of elastomer is capable of being placed in the cavity of the mold without it being necessary to create a compression of the walls of the bladder.

In a second step, a differential pressure is introduced between the internal volume 23 of the bladder 2 of a part at an internal pressure P1 and a volume outside the bladder, a volume, among other things, given rise to by the external surface 21 of the bladder 2 and a surface of the cavity of the mold, at the external pressure P2.

During this second step, the pressure P1 is kept higher than the pressure P2 and the value of the differential pressure $\Delta Pg = P1 - P2$ is established and maintained at a sufficient value so that the external surface of the bladder 2 is deformed and plated against the surface of the cavity of the mold in such a way that the bladder then has exactly the shape of the cavity of the mold and hence of the core 1.

This result is achieved thanks to the elasticity of the walls of the bladder 2 made of elastomer when the differential pressure $\Delta Pg$ is brought to a suitable value, taking into account the characteristics of the bladder, namely its dimensions and the thickness of the wall.

The differential pressure $\Delta Pg$ is obtained by an increase in the pressure P1 in the bladder, an inflation of the bladder, or by a decrease in the pressure P2 in the mold, a partial vacuuming of the mold, or by a combination of these two methods, the operation being carried out in a practical manner in a workshop under atmospheric pressure.

In a third step, the differential pressure $\Delta Pg$ being maintained, the internal volume 23 of the bladder 2 is filled through the opening 41 with the granular material 3, for example, with rigid beads, such as metallic beads or borosilicate [sic, obvious typo in original—Tr.Ed.] beads, having sufficiently reduced dimensions for filling said internal volume of the bladder without difficulties.

In the present case of a core 1 of great length, a material, whose coefficient of dilatation is close to that of the composite material of the part 10 to be made, shall preferably be used as the granular material 3 in order to avoid introducing stresses during the process of making the part, which would be the source of differences in dilatation between the composite material of the part, on the one hand, and the core, on the other hand, whose length favors elongation under the effect of changes in temperature during the manufacturing process.

In a fourth step, when the internal volume 23 of the bladder 2 is filled with the granular material 3, the differential pressure $\Delta Pg$ is relaxed, i.e., the pressures P1 and P2 are brought to close values, and a new differential pressure $\Delta Pe$ is created between the internal volume 23 and the external space of the bladder and whose sign is reversed in relation to $\Delta Pg$, i.e., the internal volume of the bladder is at a pressure P'1 lower than the pressure P'2 of the external space.

This differential pressure $\Delta Pe = P'1 - P'2$, which brings about forces crushing the bladder 2, has the effect of bringing about a compaction of the granular material 3, a compaction which in turn has the effect, because of the nature and the filling of the said granular material, of stabilizing the shape of the core 1 without more or less modifying the volume thereof.

Advantageously, to create the differential pressure $\Delta Pe$, the internal volume 23 of the bladder 2 is subjected to a partial vacuum while the external pressure is atmospheric pressure.

In a fifth step, while the differential pressure $\Delta Pe$ is maintained, the formed core 1 is removed from the core mold, ready to be used for making the part 10 made of composite material.

When the part 10 made of composite material is hardened, the granular material 3 in the bladder is discharged at least in part through the opening 41 provided for this purpose and the bladder 2, whose envelope made of elastomer having lost its stiffness and its dimensional stability is again in the part, is extracted without difficulty by pulling at one of its ends because of its relative suppleness.

Thanks to the method of making the core 1 of great length from the essentially cylindrical bladder 2 made of elastomer, it is possible to use bladders made by extrusion-pultrusion with the manufacturing tolerances of the bladder, on the characteristic dimensions of the cross sections, which are compatible with the extrusion-pultrusion method applied to the elastomer material of the bladder, in particular silicone.

The length Ln of the bladder is not theoretically limited, and does not require techniques for connecting components to increase the length of the bladder, which connections are sources of molding defects and hence a source of markings on the final composite part, and risks of tearing of the bladder during the removal of the cores from the mold.

Thanks to the method, it is also possible to make cores having shapes, in particular, having curvatures and laws of variations of standard cross sections which are different from the same bladder or a same bladder model, which more or less simplifies the industrial process of making cores and managing bladders.

It is thus possible to manufacture bladders for making cores of very great length, which are suitable for making panels made of composite material comprising very elongated hollow volumes such as the volumes enveloped by stiffeners in an economical manner, a simplified use compared to bladders of the prior art, and significantly reducing the industrial risks such as shape defects, markings of the composite parts, and tearing of the bladders during the removal of the cores from the mold.

The invention claimed is:

1. A method for making a molding core for the manufacturing of a part made of composite material, the molding core having an elongated form, corresponding to a hollow cavity of said part to manufacture, one dimension, the length Ln, being great with regard to the characteristic dimensions, widths In and heights hn, of cross sections of said molding core, said molding core comprising one or more local curvatures, in the longitudinal direction of the molding core, on a surface of the molding core and/or comprising changes in the forms and sizes of cross sections of the molding core depending on a position along the length of said molding core, said method comprising the steps of:

producing a cylindrical bladder, a cylindrical part of which is produced by extrusion-pultrusion of an elastomer such that all cross sections of said cylindrical bladder are identical within manufacturing tolerances, made of elastomer, giving rise to an internal volume, having at least the length Ln of the molding core to be made and having an external perimeter with a corresponding cross section, constant within the manufacturing tolerances, and equal to or lower than a lowest of the perimeters of the cross sections of the molding core to be made, the bladder having a shape and size that are different than a shape and size of the molding core to be made; then conforming the bladder in a core mold, said core mold comprising a hollow cavity with shapes of at least the local curvatures in the longitudinal direction of the molding core to be made, and having the forms and sizes of each cross section all along the length of the molding core to be made, by deforming the bladder by applying a differential pressure ΔPg between the internal volume of said bladder at a pressure P1 and an external space at a pressure P2 which is below P1, such that the initially cylindrical bladder is deformed and plated against a surface of the cavity of the core mold; and then filling the bladder with a granular material and then applying a differential pressure ΔPe between the internal volume and the external space of the bladder, such that the internal space is at a pressure below the external space.

2. A method in accordance with claim 1, in which the differential pressure ΔPg is obtained at least in part by a partial vacuuming of a space located between the core mold and an external surface of the bladder.

3. A method in accordance with claim 1, in which the differential pressure ΔPg is obtained at least in part by an increase of the pressure in the internal volume of the bladder.

4. A method in accordance with claim 1, wherein the bladder is formed by a cylindrical length closed at its ends by end parts to ensure a tightness of the internal volume of the bladder, said cylindrical part being obtained by a method of extrusion-pultrusion of the elastomer.

5. A method in accordance with claim 1, wherein the bladder comprises end parts mounted on the ends of a cylindrical length of the bladder to ensure a tightness of the internal volume, at least one of said end parts comprising an opening allowing the filling or extracting of the granular material from the internal volume and at least one of the said end parts comprising means used for connecting to means for exhausting or generating a gas under pressure.

* * * * *